Feb. 2, 1954  H. B. BARRETT  2,667,781
BRAKE LINING TESTING MACHINE
Filed Aug. 28, 1950
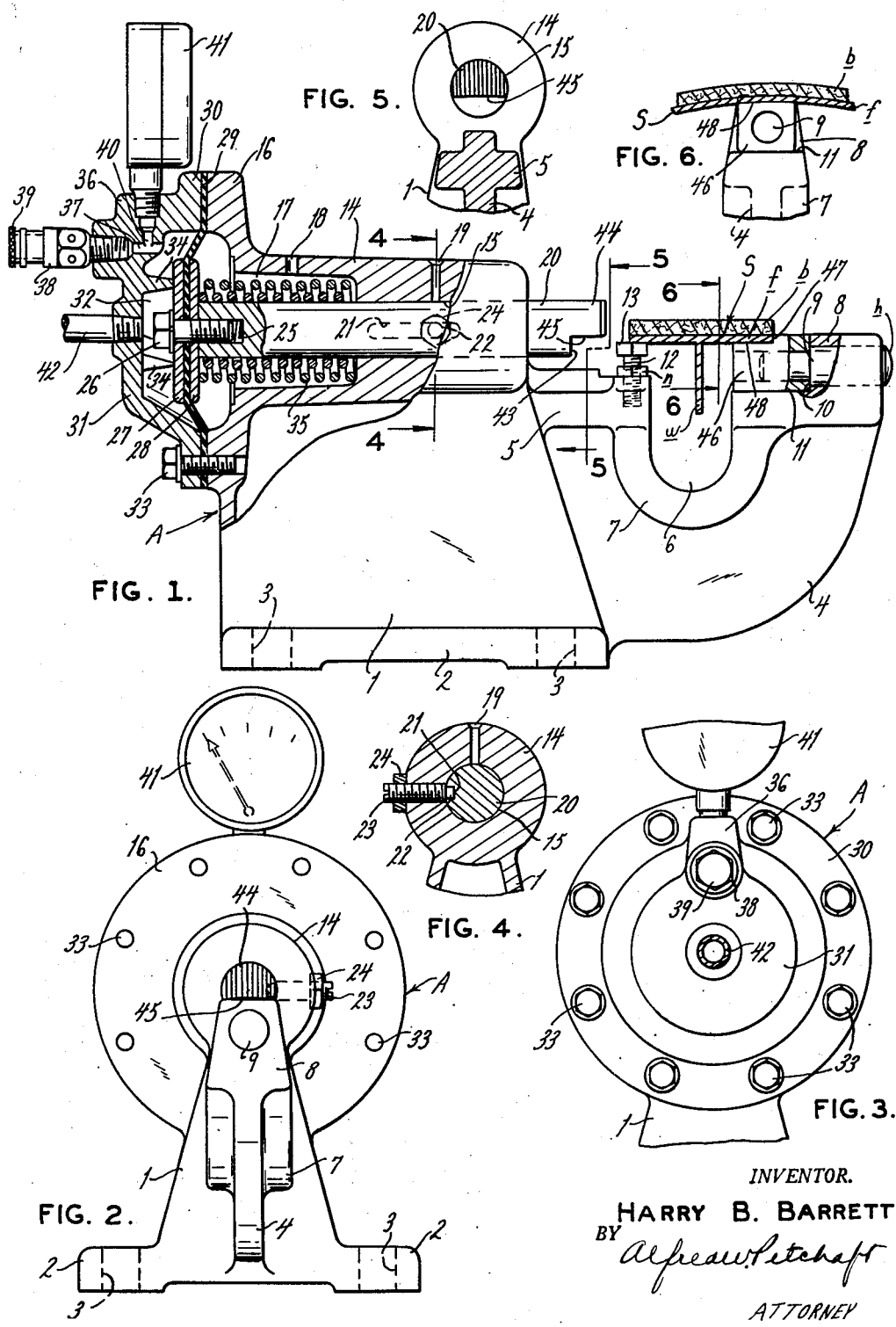
INVENTOR.
HARRY B. BARRETT
BY Alfred W. Petchaft
ATTORNEY Patented Feb. 2, 1954

2,667,781

UNITED STATES PATENT OFFICE 2,667,781

BRAKE LINING TESTING MACHINE

Harry B. Barrett, St. Louis, Mo.

Application August 28, 1950, Serial No. 181,781

7 Claims. (Cl. 73—101)

1

This invention relates in general to certain new and useful improvements in brake lining testing machines and, more particularly, to a testing machine for determining the degree of adherence between a brake shoe and brake lining which is adhesively bonded thereto.

In recent years it has become a widely accepted practice in the automotive industry to secure brake linings to automotive brake shoes solely by adhesives, such as thermo-setting resin-type cements. Generally speaking, this type of brake shoe is referred to as a "bonded" shoe and the conventional rivets are either entirely eliminated or reduced to very few in number. Bonded brake linings are applied to the brake shoe under controlled heat and pressure such that the thermo-setting resin which is interposed between the brake shoe and lining will form a tight, adherent, cementitious bond. It is, of course, obvious that the efficiency and safety of bonded brake shoes is dependent solely upon the effectiveness of the bond which is created between the lining and the shoe, and a great deal of difficulty has been experienced in achieving uniformly satisfactory results in bonding operations. Hitherto, brake repair mechanics have relied solely upon visual inspection accompanied by manual manipulation of the bonded brake shoe and lining prior to installation in the brake assembly of the automobile. If the cementitious bond looked and felt satisfactory, the shoe was installed on the vehicle. Testing by visual inspection and manual manipulation is at best inexact and has been found to lead, in some cases, to tragic automobile accidents attributable to malfunctioning of the brakes.

It is, therefore, the primary object of the present invention to provide a machine for testing the strength of the cementitious bond between a brake shoe and the lining bonded thereto.

It is a further object of the present invention to provide a testing machine of the type stated which is simple and economical in construction and can be operated quickly and efficiently by the average automotive repair mechanic without any undue amount of specialized training or skill.

It is an additional object of the present invention to provide a testing machine of the type stated which is rugged and durable and will withstand extensive use without requiring replacement of parts or major repairs.

It is also an object of the present invention to provide a testing machine which is capable of rendering substantially uniform and standardized test-results in a simple and readily interpretable manner.

2

With the above and other objects in view, my invention resides in the novel features of form, construction, arrangement, and combination of parts presently described and pointed out in the claims.

In the accompanying drawings—

Figure 1 is a side elevational view partly broken away and in section of a brake shoe testing machine constructed in accordance with, and embodying the present invention.

Figure 2 is a front elevational view of the brake shoe testing machine.

Figure 3 is a fragmentary rear elevational view of the brake shoe testing machine; and Figures 4, 5 and 6 are fragmentary sectional views taken along lines 4—4, 5—5, and 6—6 respectively of Figure 1.

Referring now in more detail and by reference characters to the drawings which illustrate a preferred embodiment of the present invention, A designates a brake shoe testing machine comprising a hollow base casting 1 having integrally formed horizontally extending ears 2 which are vertically bored in the provision of bolt-receiving apertures 3, by which the machine may be conventionally bolted down to any suitable table, pedestal, base or other support (not shown).

Formed integrally with, and projecting forwardly from, the front wall or base casting 1 is an outwardly extending arm 4 provided along its upper horizontal margin with a relatively thick top flange 5 formed in its central portion with an upwardly opening U-shaped recess 6, the lower margin of which is reinforced with a correspondingly shaped semi-circular flange 7. At its forward or outer end the flange 5 is integrally provided with an enlarged boss 8, which is horizontally bored for slidably receiving the stud 9, which projects outwardly therefrom at its forward end in the provision of an impact head h. The stud 9 at its rearward end is diametrally reduced to form an annular shoulder 10 and such diametrally reduced end projects rearwardly over, and in upwardly spaced parallel relation to a flat face 11 milled horizontally across the top of the flange 5 between the rear face of the boss 8 and the proximate margin of the U-shaped recess 6. On the opposite side of the U-shaped recess, with respect to the face 11, the flange 5 is provided with a vertically adjustable screw 12 having an integrally formed brake shoe supporting pad 13 at its upper end and held in any selected position of vertical adjustment by a locknut n.

Formed integrally with and extending horizontally across the top of the base casting 1 is a tubular housing 14 having a horizontally disposed smooth bore 15, the axial or center line of which is coincident with the vertical center plane of the arm 4. It will be noted that the axial or center line of the pin 9 also lies in this same vertical center plane. At its rear end the housing 14 is diametrally enlarged in the provision of an annular diaphragm flange 16 and forwardly of the diaphragm flange for approximately half of its length the shell is counterbored in the provision of an intermediate recess 17. In addition, the shell is provided at suitably spaced points along its length with a vertically disposed vent-hole 18 and oil-hole 19. Slidably mounted in and projected forwardly from the bore 15 is a rod-shaped ram 20 provided along that portion of its length which is located in the bore 15 with a laterally presented horizontal slot 21 adapted for sliding engagement with the reduced end 22 of a stop screw 23 which is threadedly mounted in and extends through one side of the housing 14 and is held in place by a lock nut 24. The reduced end 22 of the stop pin 23 will engage either of the opposite ends of the slot 21 so as to limit both forward and rearward movement of the ram 20 and prevent unauthorized withdrawal of the ram 20 from the bore 15. At its rearward end the ram 20 projects through the recess 17 and is co-axially drilled as at 25 to receive a bolt 26 which extends through a pair of diaphragm disks 27, 28 respectively disposed on opposite sides of a flexible diaphragm 29 which is in turn disposed around its peripheral margin against the flat face of the diaphragm flange 16, being secured in pressure tight engagement by the corresponding annular flange 30 of a cover plate 31, the latter extending over and in outwardly spaced relation to the diaphragm 29 in the formation of a pressure chamber 32, the cover plate 31 being conventionally held in place by a uniformly spaced annular series of bolts 33.

It should be noted in this connection that the inner face of the cover plate 31 is provided with three horizontally inwardly projecting bosses 34 disposed at sixty degrees from each other concentrically around the axial line of the ram 20 for endwise abutting engagement against the rearwardly presented face of the diaphragm disk 27 to act as a rear stop, against which the diaphragm-assembly will normally be biased by a heavy double-wound compression spring 35 which is disposed encirclingly around the portion of the ram 20 which extends through the recess 17, the spring 35 being disposed abuttingly at its opposite ends respectively against the forwardly presented face of the diaphragm disk 28 and the rearwardly presented or inner end-wall of the recess 17.

The cover plate 31 is provided, vertically above its center, with an integral boss 36 which is horizontally drilled from its rear face in the provision of an air passage 37, which communicates at its forward end with the chamber 32 and at its rearward end is counter-bored and threaded to receive a conventional adjustable pressure relief valve 38 having a spring biased element 39 which can be screwed in or out so that pressure within the chamber 32 can be maintained at any desired maximum within the range of adjustment for which the valve was designed. The boss 36 is also provided with a vertical air passage 40 opening downwardly into the air passage 37. At its upper end the passage 40 is counterbored and threaded for receiving a conventional air pressure gauge 41.

Threadedly mounted in and extending through the central portion of the cover 31, preferably, though not necessarily, in axial alignment with the ram 30, is an air pipe 42 which is connected to a conventional source of air pressure (not shown).

The outwardly or forwardly projecting end of the ram 20 is milled off along its underface as at 43 to provide a pressure-applying portion or element 44 which is of reduced cross-sectional area and has a downwardly presented or underface 45 which is arcuate along a radius approximately corresponding to the radius of the brake which is to be tested. The underface 43 furthermore is spaced upwardly from the horizontal face 11 of the brake-shoe supporting pad 13 by a distance slightly greater than the thickness of the flange f of the brake shoe S so that the pressure asserted by the ram 20 will be applied to the edge of the brake lining b. In order to facilitate the application of pressure to brake lining b, the end face of the ram 20 is preferably serrated as best seen in Figure 5.

Removably mounted upon the pin 9 and resting snugly upon the upwardly presented face 11 of the arm-flange 5 is an anvil block 46 which is likewise cut away upon its upper face to provide a shoulder 47 and an arcuate supporting face 48, the latter being similar in contour to and in aligned registration with the supporting face 13. The vertical height of the shoulder 47 is somewhat smaller than the thickness of the brake shoe flange f.

In use, the bonded brake shoe S is set down upon the supporting surfaces 13, 48 in more or less centered or balanced relationship thereon with the brake shoe web w extending freely downwardly into the U-shaped slot 6. The forwardly presented edge-face of the brake shoe will abut snugly against the shoulder 47. Thereupon air pressure is admitted through the air pipe 42 into the chamber 32 by means of any suitable valve (not shown). The pressure will build up to whatever maximum limit is permitted by the relief valve 38 and the diaphragm 29 will be pushed forwardly against the counterbalancing tension of the spring 35, thereby urging the ram forwardly. This initial forward movement preferably should be slowly and carefully performed so as to bring the serrated pressure-applying element 44 gently against the edge-face of the brake lining b directly opposite the shoulder 47. Thereupon the pressure may be allowed to build up very rapidly imposing the desired force against the brake lining b. This force or pressure may, of course, be measured by the reading of the gauge 41 and will be imposed as a shear force directly across the area in which the cementitious binder is applied. As will be seen by reference to Figure 1, the shoulder 47 holds the brake shoe flange f stationary while the pressure applying element 44 of the ram tends to push the brake lining b forwardly. By increasing the maximum limit of pressure through suitable manipulation of the valve element 39 it is possible to determine the maximum limit of shear force which the cementitious bond will withstand, since the ram will break the lining section b away from the brake shoe flange f at a pressure in excess of such maximum. Because some adhesives or bonding agents are brittle and will fail under shock even though capable of withstanding gradually applied pressures, it may be desired to "shock-test" the bond. In such case the impact head h of pin 9 may be tapped with a hammer after the pressure has been built up to the desired limit. It will, of course, be understood that the amount of impact can be determined by a process of training in the use of this equipment.

By actual test under operating conditions the necessary amount of strength required for such cementitious bonds may be determined for any given type of brake shoe, brake lining or set of established mechanical condition. Thereafter, subsequent bonded brake shoes can be tested to determine whether or not the bond will withstand the requisite amount of shear force. If, in establishing test results, an adequate margin of safety is allowed as is customary in testing all automotive equipment, it will be possible to insure against improper, defective or unsatisfactory bonding.

It should be understood that changes and modifications in the form, construction, arrangement, and combination of the several parts of the brake lining testing machine may be made and substituted for those herein shown and described without departing from the nature and principle of my invention.

Having thus described my invention, what I claim and desire to secure by Letters Patent is:

1. A testing machine for determining the strength of securement between a brake lining and the brake shoe upon which it is mounted, said testing machine comprising a bracket having two upwardly presented spaced shoulders, an anvil mounted on one of the shoulders and being provided with an upstanding abutment, the height of which is slightly less than the thickness of the brake shoe, a support-member mounted on the other shoulder and having an upwardly presented face, said anvil and said upwardly presented face of the support-member being adapted for supporting the brake shoe with one of its edge-portions on the anvil and engaged against the abutment and with the brake lining in upwardly presented position and with the lateral edges of the brake lining free and unsupported except for its securement to the shoe and a bracket having two upwardly presented spaced shoulders, an anvil mounted on one of the shoulders and being provided with an upstanding abutment, the height of which is slightly less than the thickness of the brake shoe, a support-member mounted on the other shoulder and having an upwardly presented face, said anvil and said upwardly presented face of the support-member being adapted for supporting the brake shoe with one of its edge-portions on the anvil and engaged against the abutment and with the brake lining in upwardly presented position and with the lateral edges of the brake lining free, means for applying a measured force against and at right angles to that lateral edge of the brake lining which is on the opposite side of the brake shoe with respect to the anvil-engaged portion of the shoe whereby to produce relative movement between the shoe and the brake lining when the force is sufficient to overcome the retentive strength of the securement between the shoe and the lining.

2. A testing machine for determining the strength of securement between a brake lining and the brake shoe upon which it is mounted, said testing machine comprising a bracket having two upwardly presented spaced shoulders, an anvil mounted on one of the shoulders and being provided with an upstanding abutment, the height of which is slightly less than the thickness of the brake shoe, a support-member mounted on the other shoulder and having an upwardly presented face, said anvil and said upwardly presented face of the support-member being adapted for supporting the brake shoe with one of its edge-portions on the anvil and engaged against the abutment and with the brake lining in upwardly presented position and with the lateral edges of the brake lining free and unsupported except for its securement to the shoe, a ram disposed in outwardly spaced relation to one lateral face of the brake lining, and means for shifting the ram against the lateral face of the lining for imposing shear-force against and at right angles to that lateral edge of the brake lining which is on the opposite side of the brake shoe with respect to the anvil-engaged portion of the shoe whereby to produce relative movement between the shoe and the brake lining when the force is sufficient to overcome the retentive strength of the securement between the shoe and the lining.

3. A testing machine for determining the strength of securement between a brake lining and the brake shoe upon which it is mounted, said testing machine comprising a bracket having two upwardly presented spaced shoulders, an anvil mounted on one of the shoulders and being provided with an upstanding abutment, the height of which is slightly less than the thickness of the brake shoe, a support-member mounted on the other shoulder and having an upwardly presented face, said anvil and said upwardly presented face of the support-member being adapted for supporting the brake shoe with one of its edge-portions on the anvil and engaged against the abutment and with the brake lining in upwardly presented position and with the lateral edges of the brake lining free and unsupported except for its securement to the shoe, a ram disposed in outwardly spaced relation to one lateral face of the brake lining, spring means for biasing the ram away from the lining, and pneumatic means for shifting the ram against the lateral face of the lining for imposing shear-force against and at right angles to that lateral edge of the brake lining which is on the opposite side of the brake shoe with respect to the anvil-engaged portion of the shoe whereby to produce relative movement between the shoe and the brake lining when the force is sufficient to overcome the retentive strength of the securement between the shoe and the lining.

4. A testing machine for determining the strength of securement between a brake lining and the brake shoe upon which it is mounted, said machine comprising a base, an upwardly opening U-shaped bracket arm extending outwardly from the side of the base, said bracket arm including a bight portion and two upwardly presented shoulders on opposite sides of the bight, a brake shoe supporting anvil mounted on the shoulder which is on the outer side of the bight with respect to the base against which one side of the brake shoe may abut, a brake shoe supporting pad mounted upon the other shoulder and having an upwardly presented face upon which the brake shoe may shiftably rest, a horizontally disposed tubular housing mounted upon the upper end of the base, said tubular housing being enlarged at one end in the provision of a concentric chamber, a diaphragm mounted closure-wise across said chamber, a cover plate disposed across the outer face of said diaphragm and secured around its periphery to the peripheral portion of the housing for holding the diaphragm tightly clamped therebetween, said cover plate being disposed for a portion of its area in outwardly spaced relation to the diaphragm in the position of a chamber across the outer face thereof, a ram shiftably mounted in the housing in axial alignment with the pad and anvil and being secured at its inner end to the diaphragm for horizontal reciprocating movement responsive to the movement of the diaphragm, said ram projecting at its opposite end outwardly from the housing for impinging engagement against one lateral face of the brake lining, and means for introducing pressure into one of the diaphragm chambers for producing movement thereof.

5. A testing machine for determining the strength of securement between a brake lining and the brake shoe upon which it is mounted, said machine comprising a base, an upwardly opening U-shaped bracket arm extending outwardly from the side of the base, said bracket arm including a bight portion and two upwardly presented shoulders on opposite sides of the bight, a brake shoe supporting anvil mounted on the shoulder which is on the outer side of the bight with respect to the base against which one side of the brake shoe may abut, a brake shoe supporting pad mounted upon the other shoulder and having an upwardly presented face upon which the brake shoe may shiftably rest, a horizontally disposed tubular housing mounted upon the upper end of the base, said tubular housing being enlarged at one end in the provision of a concentric chamber, a diaphragm mounted closure-wise across said chamber, a cover plate disposed across the outer face of said diaphragm and secured around its periphery to the peripheral portion of the housing for holding the diaphragm tightly clamped therebetween, said cover plate being disposed for a portion of its area in outwardly spaced relation to the diaphragm in the position of a chamber across the outer face thereof, a ram shiftably mounted in the housing in axial alignment with the pad and anvil and being secured at its inner end to the diaphragm for horizontal reciprocating movement responsive to the movement of the diaphragm, said ram projecting at its opposite end outwardly from the housing for impinging engagement against one lateral face of the brake lining, spring means mounted in one of said diaphragm chambers for biasing the diaphragm in the direction of the other chamber, and means for introducing pressure into said other chamber for actuating the diaphragm against the bias of said spring.

6. A testing machine for determining the strength of securement between a brake lining and the brake shoe upon which it is mounted, said machine comprising a base, an upwardly opening U-shaped bracket arm extending outwardly from the side of the base, said bracket arm including a bight portion and two upwardly presented shoulders on opposite sides of the bight, a brake shoe supporting anvil removably mounted on one shoulder and having a laterally presented shoulder against which one side of the brake shoe may abut, a brake shoe supporting pad adjustably mounted upon the other shoulder and having an upwardly presented face upon which the brake shoe may shiftably rest, a horizontally disposed tubular housing mounted upon the upper end of the base, said tubular housing being enlarged at one end in the provision of a concentric chamber, a diaphragm mounted closure-wise across said chamber, a cover plate disposed across the outer face of said diaphragm and secured around its periphery to the peripheral portion of the housing for holding the diaphragm tightly clamped therebetween, said cover plate being disposed for a portion of its area in outwardly spaced relation to the diaphragm in the position of a chamber across the outer face thereof, a ram shiftably mounted in the housing in axial alignment with the pad and anvil and being secured at its inner end to the diaphragm for horizontal reciprocating movement responsive to the movement of the diaphragm, said ram projecting at its opposite end outwardly from the housing for impinging engagement against one lateral face of the brake lining, and means for introducing pressure into one of the diaphragm chambers for producing movement thereof.

7. A testing machine for determining the strength of securement between a brake lining and the brake shoe upon which it is mounted, said machine comprising a base, an upwardly opening U-shaped bracket arm extending outwardly from the side of the base, said bracket arm including a bight portion and two upwardly presented shoulders on opposite sides of the bight, a brake shoe supporting anvil mounted against which one side of the brake shoe may abut, a brake shoe supporting pad mounted upon the other shoulder and having an upwardly presented face upon which the brake shoe may shiftably rest, a horizontally disposed tubular housing mounted upon the upper end of the base, said tubular housing being enlarged at one end in the provision of a concentric chamber, a diaphragm mounted closure-wise across said chamber, a cover plate disposed across the outer face of said diaphragm and secured around its periphery to the peripheral portion of the housing for holding the diaphragm tightly clamped therebetween, said cover plate being disposed for a portion of its area in outwardly spaced relation to the diaphragm in the position of a chamber across the outer face thereof, said cover plate being provided with inwardly projecting abutment means for engagement stopwise against the diaphragm, a spring operatively mounted on the opposite side of the diaphragm for holding the diaphragm against said abutment means with a predetermined amount of spring loading, a ram shiftably mounted in the housing in axial alignment with the pad and anvil and being secured at its inner end to the diaphragm for horizontal reciprocating movement responsive to the movement of the diaphragm, said ram projecting at its opposite end outwardly from the housing for impinging engagement against one lateral face of the brake lining, and means for introducing pressure into one of the diaphragm chambers for producing movement thereof.

HARRY B. BARRETT.

References Cited in the file of this patent

UNITED STATES PATENTS

| Number | Name | Date |
|---|---|---|
| 1,598,866 | Lovell | Sept. 7, 1926 |
| 2,261,783 | Stull | Nov. 4, 1941 |
| 2,353,056 | Martindell | July 4, 1944 |
| 2,425,931 | Golick | Aug. 19, 1947 |
| 2,498,265 | Green | Feb. 21, 1950 |